United States Patent
Kim et al.

(10) Patent No.: US 9,796,276 B2
(45) Date of Patent: Oct. 24, 2017

(54) INVERTER CONTROL METHOD FOR HYBRID VEHICLE

(71) Applicant: Hyundai Motor Company, Seoul (KR)

(72) Inventors: Young Un Kim, Gyeonggi-do (KR); Jeongwon Rho, Seoul (KR); Jae Sang Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 14/943,446

(22) Filed: Nov. 17, 2015

(65) Prior Publication Data

US 2016/0368388 A1     Dec. 22, 2016

(30) Foreign Application Priority Data

Jun. 18, 2015 (KR) .................. 10-2015-0086700

(51) Int. Cl.
  *H02P 7/00* (2016.01)
  *H02P 6/18* (2016.01)
  *B60L 11/18* (2006.01)
  *B60L 15/08* (2006.01)
  *H02P 27/08* (2006.01)
  *H02P 29/50* (2016.01)

(52) U.S. Cl.
  CPC ............ *B60L 11/1803* (2013.01); *B60L 15/08* (2013.01); *H02P 27/085* (2013.01); *H02P 29/50* (2016.02); *Y02T 10/7005* (2013.01); *Y10S 903/906* (2013.01)

(58) Field of Classification Search
  CPC ......... B60L 2240/421; B60L 2240/423; B60L 11/14; B60L 11/1803; B60L 15/025; B60L 11/123; B60L 15/20; B60L 2240/36; B60L 2240/486; B60L 2250/26; B60L 7/14; B60L 15/2009; B60L 15/2045; B60L 2240/12
  USPC .... 318/432, 400.02, 400.09, 400.27, 400.34; 180/446
  See application file for complete search history.

(56) References Cited

U.S. PATENT DOCUMENTS

| | | | | |
|---|---|---|---|---|
| 5,936,378 | A * | 8/1999 | Iijima ................. | B60L 7/14 318/400.27 |
| 6,018,694 | A * | 1/2000 | Egami ................. | B60K 6/24 180/65.23 |
| 6,388,419 | B1 * | 5/2002 | Chen ................. | B60L 11/14 318/727 |

(Continued)

FOREIGN PATENT DOCUMENTS

| JP | 4605274 B2 | 1/2011 |
|---|---|---|
| JP | 2014-011844 A | 1/2014 |

(Continued)

*Primary Examiner* — Paul Ip
(74) *Attorney, Agent, or Firm* — Mintz Levin Cohn Ferris Glovsky and Popeo, P.C.; Peter F. Corless (57) ABSTRACT

An inverter control method for a hybrid vehicle includes: monitoring a torque command and a motor speed of the vehicle in real-time; determining whether the motor speed is less than a first speed; determining whether an absolute value of the torque command is less than a first torque when the motor speed is less than the first speed; changing a switching frequency to a predetermined frequency when the absolute value of the torque command is less than the first torque; and controlling an inverter operation by generating a pulse-width modulation (PWM) signal with the switching frequency changed to the predetermined frequency.

3 Claims, 6 Drawing Sheets

(56) References Cited

U.S. PATENT DOCUMENTS

| | | | |
|---|---|---|---|
| 7,694,777 B2* | 4/2010 | Yamashita | B62D 5/046 180/443 |
| 7,772,790 B2* | 8/2010 | Nashiki | H02K 1/145 318/400.02 |
| 7,960,928 B2* | 6/2011 | Tang | B60L 15/025 318/400.02 |
| 8,054,031 B2* | 11/2011 | Uechi | B60K 6/445 180/65.1 |
| 8,285,451 B2* | 10/2012 | Ta | B62D 5/046 180/446 |
| 8,387,732 B2* | 3/2013 | Okamura | B60K 6/547 180/65.275 |
| 8,710,775 B2* | 4/2014 | Sagami | B62D 5/0487 318/400.02 |
| 9,007,013 B2* | 4/2015 | Bae | B60L 11/1803 318/400.17 |
| 9,045,045 B2* | 6/2015 | Onodera | B60L 15/20 |
| 9,065,365 B2* | 6/2015 | Omata | H02P 6/10 |
| 9,088,241 B2* | 7/2015 | Wu | H02P 21/13 |
| 9,093,936 B2* | 7/2015 | Omata | H02P 6/08 |
| 9,120,388 B2* | 9/2015 | Omata | B60L 11/14 |
| 9,172,316 B2* | 10/2015 | Bae | H02P 6/002 |
| 2004/0007997 A1* | 1/2004 | Fu | H02P 21/06 318/432 |
| 2006/0145652 A1* | 7/2006 | Ta | H02P 6/16 318/807 |
| 2007/0251236 A1* | 11/2007 | Barthelet | H02P 23/0004 60/608 |
| 2008/0035411 A1* | 2/2008 | Yamashita | B62D 5/046 180/443 |
| 2008/0129243 A1* | 6/2008 | Nashiki | H02K 1/145 318/701 |
| 2008/0190680 A1* | 8/2008 | Kaneko | B60K 6/442 180/170 |
| 2008/0217099 A1* | 9/2008 | Reungwetwattana | B62D 5/0472 180/446 |
| 2009/0167234 A1* | 7/2009 | Uechi | H02P 29/68 318/800 |
| 2009/0234538 A1* | 9/2009 | Ta | B62D 5/046 701/41 |
| 2009/0314564 A1* | 12/2009 | Okamura | B60K 6/445 180/65.285 |
| 2010/0090629 A1* | 4/2010 | Tang | B60L 15/025 318/400.09 |
| 2012/0004797 A1* | 1/2012 | Baino | B60K 6/48 701/22 |
| 2012/0081047 A1* | 4/2012 | Hisada | H02P 6/06 318/400.09 |
| 2012/0176069 A1* | 7/2012 | Sagami | B62D 5/0487 318/400.02 |
| 2013/0141023 A1* | 6/2013 | Sugita | H02P 21/0003 318/400.02 |
| 2013/0141028 A1* | 6/2013 | Fujiwara | B60L 15/20 318/434 |
| 2013/0229135 A1* | 9/2013 | Long | H02P 21/13 318/400.34 |
| 2013/0231891 A1* | 9/2013 | Long | H02P 21/13 702/145 |
| 2013/0253749 A1* | 9/2013 | Hayashi | B60K 6/445 701/22 |
| 2014/0103843 A1* | 4/2014 | Bae | H02P 6/002 318/400.17 |
| 2014/0103844 A1* | 4/2014 | Omata | H02P 6/10 318/400.23 |
| 2014/0103854 A1* | 4/2014 | Bae | B60L 11/1803 318/721 |
| 2014/0184114 A1* | 7/2014 | Omata | H02P 6/08 318/400.02 |
| 2014/0225535 A1* | 8/2014 | Omata | B60L 11/14 318/34 |
| 2014/0225536 A1* | 8/2014 | Yamada | B60L 15/02 318/51 |
| 2014/0225540 A1* | 8/2014 | Omata | H02P 6/002 318/400.07 |
| 2014/0354204 A1* | 12/2014 | Tachibana | H02P 6/08 318/473 |
| 2015/0064023 A1* | 3/2015 | Sasaki | H02P 6/06 417/43 |
| 2016/0347202 A1* | 12/2016 | Sawada | B60L 15/20 |

FOREIGN PATENT DOCUMENTS

| | | |
|---|---|---|
| KR | 10-2014-0038841 | 3/2014 |
| KR | 10-2014-0049451 A | 4/2014 |
| KR | 10-2015-0025920 A | 3/2015 |

* cited by examiner

INVERTER CONTROL METHOD FOR HYBRID VEHICLE

CROSS-REFERENCE TO RELATED APPLICATION

This application claims priority to and the benefit of Korean Patent Application No. 10-2015-0086700 filed in the Korean Intellectual Property Office on Jun. 18, 2015, the entire contents of which being incorporated herein by reference.

BACKGROUND OF THE DISCLOSURE (a) Technical Field

The present disclosure relates generally to an inverter control method for a hybrid vehicle, and more particularly, to an inverter control method for a hybrid vehicle to reduce noise and to improve fuel efficiency thereof.

(b) Description of the Related Art

Nowadays, vehicles operating with an internal combustion engine using a fossil fuel such as a gasoline, a diesel, or the like can cause problems such as environmental pollution by exhaust gases, global warming by carbon dioxide, and respiratory ailments by ozone formation. Moreover, the amount of fossil fuel on the earth is limited, so it eventually can be depleted.

To solve the above-mentioned problems, environmentally-friendly vehicles, such as an electric vehicle (EV) using an electric motor, a hybrid electric vehicle (HEV) using an engine and an electric motor, a fuel cell electric vehicle (FCEV) using an electric motor by electricity generated by a fuel cell, or the like has been in development. Such environmentally-friendly vehicles drive a motor by inverting a DC power charged in a main battery of a vehicle to a 3-phase AC power using an inverter, and delivers a driving torque of the motor to a driving wheel to drive a vehicle.

However, in a motor system including a motor and an inverter, which serves as a driving source of an environmentally-friendly vehicle, various problems such as a noise generated in a driving/regenerating operation, an efficiency deterioration caused by switching loss, an electromagnetic performance deterioration, or the like can arise.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

An object of the present disclosure is to solve the above-mentioned problems as well as other problems. The present disclosure has been made in an effort to provide an inverter control method for a hybrid vehicle having advantages of reducing noise. Also, the present disclosure has been made in an effort to provide an inverter control method for a hybrid vehicle having advantages of improving fuel efficiency.

Embodiments of the present disclosure provide an inverter control method for a hybrid vehicle including: monitoring a torque command and a motor speed of the vehicle in real-time; determining whether the motor speed is less than a first speed; determining whether an absolute value of the torque command is less than a first torque when the motor speed is less than the first speed; changing a switching frequency to a predetermined frequency when the absolute value of the torque command is less than the first torque; and controlling an inverter operation by generating a pulse-width modulation (PWM) signal with the switching frequency changed to the predetermined frequency.

The changing of the switching frequency to the predetermined frequency may include changing a mode between a double sampling mode using a frequency which is twice the switching frequency as a sampling frequency, and a single sampling mode using an identical frequency to the switching frequency as the sampling frequency.

The inverter control method may further include controlling the inverter operation by generating a PWM signal with a fixed switching frequency when the motor speed is greater than or equal to the first speed.

The inverter control method may further include controlling the inverter operation by generating the PWM signal with the fixed switching frequency when the absolute value of the torque command is greater than or equal to the first torque.

Certain effects of the inverter control method for a hybrid vehicle according to embodiments of the present disclosure are as follows.

For instance, there may be an advantage of improving fuel efficiency. Further, there may be an advantage of reducing motor noise.

Additional possibilities for implementing the present disclosure will be apparent based on the following detailed descriptions. However, as those skilled in the art would realize, the described embodiments may be modified in various different ways, all without departing from the spirit and scope of the present disclosure, so it will be understood that embodiments are provided as a mere example.

DETAILED DESCRIPTION OF THE EMBODIMENTS

Hereinafter, the present disclosure will be described more fully with reference to the accompanying drawings, while same or similar constituent elements are designated same or similar reference numeral and duplicating descriptions thereof will be omitted. A suffix of a component using terms such as "module", "unit", "part", "member", "element", "portion", and the like hereinafter are given or mixed as being taken into consideration only the ease of creating the specification, are not to be distinguished from each other having a meaning or role by themselves. Further, in describing the related art in the following descriptions, if it is determined that the subject matter of the present disclosure may be cloudy by the description, it will be omitted. Further, annexed drawings are only for ease of understanding disclosed exemplary embodiments and the spirit and scope of the present disclosure is not limited by annexed drawings. Furthermore, it will be understood that any modification, equivalents, and substitutions are included in the spirit and scope of the present disclosure.

Terms including ordinal numbers such as first, second, and the like may be used to describe various constituent elements, however the constituent elements are not limited by the terms. The terms are used only to distinguish one constituent element from other constituent elements. As used herein, the singular forms "a", "an" and "the" are intended to include the plural forms as well, unless the context clearly indicates otherwise.

It will be understood that when a constituent element is referred to as being "connected" or "contacted" to another constituent element, it can be directly connected or contacted to the other constituent element or intervening elements may also be present. In contrast, when a constituent element is referred to as being "directly connected", or "directly contacted" to another constituent element, there are no intervening elements present. A singular expression includes a plural expression, unless clearly distinguished therefrom in a context.

In the present disclosure, it will be understood that the term, "comprise", "include", "have", and the like are to designate an existence of a characteristic, a number, a step, a motion, a constituent element, a component, or a combination thereof, and not to exclude other existences of a characteristic, a number, a step, a motion, a constituent element, a component, or a combination thereof, or an additional possibility thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Generally, in the case of increasing a switching frequency of an inverter included in a motor system, noise may be decreased and, in the case of decreasing the switching frequency, inverter efficiency and fuel efficiency may be improved. That is, when the inverter switching frequency is set to a low fixed frequency (e.g., a base switching frequency is fixed to 4 KHz), while electromagnetic performance may be fine, however, in a noise issue, it may be adverse.

When the base switching frequency is set to a high fixed frequency (e.g., the base switching frequency is fixed to 8 KHz) through an entire operational area to reduce such inverter noise, NVH performance may be improved (i.e. a PWM current ripple is reduced), while electromagnetic performance may be deteriorated and switching loss may be increased (i.e., heel hold performance is deteriorated in a vehicle constraint condition), so inverter efficiency and fuel efficiency may be degraded. In further describing electromagnetic performance, as the switching frequency increases, radiated electromagnetic noise increases (e.g., an AM radio reception becomes poor as a result) and as the switching frequency decreases, radiated noise decreases, so electromagnetic performance becomes improved.

In a conventional environmentally-friendly vehicle, the inverter switching frequency is set to be high (e.g., 8 KHz) and fix it to reduce inverter noise, and a sampling frequency to obtain information such as sensing current information, motor angular information, and the like for controlling the inverter is set to an identical frequency to the switching frequency (e.g., 8 KHz).

Herein, the switching frequency (i.e., a switching period) may be defined as a period that ON/OFF of an individual switch in the inverter is repeated each once, and the sampling frequency is a frequency corresponding to a control period in an inverter current control. Herein, the control period may be defined as a period of a repeating cycle of a current/angle sampling, a current control operating, a duty calculating, and a duty updating.

However, when one switching frequency is fixed and used through the entire operational area without considering a motor driving situation or the like, an environmentally-friendly vehicle has characteristics of high switching loss caused by a heat emission of, e.g., a switching element and weak electromagnetic performance. Further, in the sampling frequency, in the case that the sampling frequency is high, inverter control stability is improved, while control factors such as sensing current information, motor angular information, and the like are obtained in a shorter period, so more calculations thereof are required in a micro-computer. Accordingly, a load ratio of the micro-computer is problematically increased.

Hereupon, with considering noise, vibration, and harshness (NVH) performance, electromagnetic performance, a switching loss issue, control stability, the micro-computer load ratio, and the like, an appropriate control of frequencies of the switching and the sampling depending on a driving situation is required.

Hereinafter, an inverter control method for a hybrid vehicle improving fuel efficiency and reducing noise by appropriately controlling frequencies of the switching and the sampling will be described with reference to FIG. 1 and FIG. 2.

Figure 1:
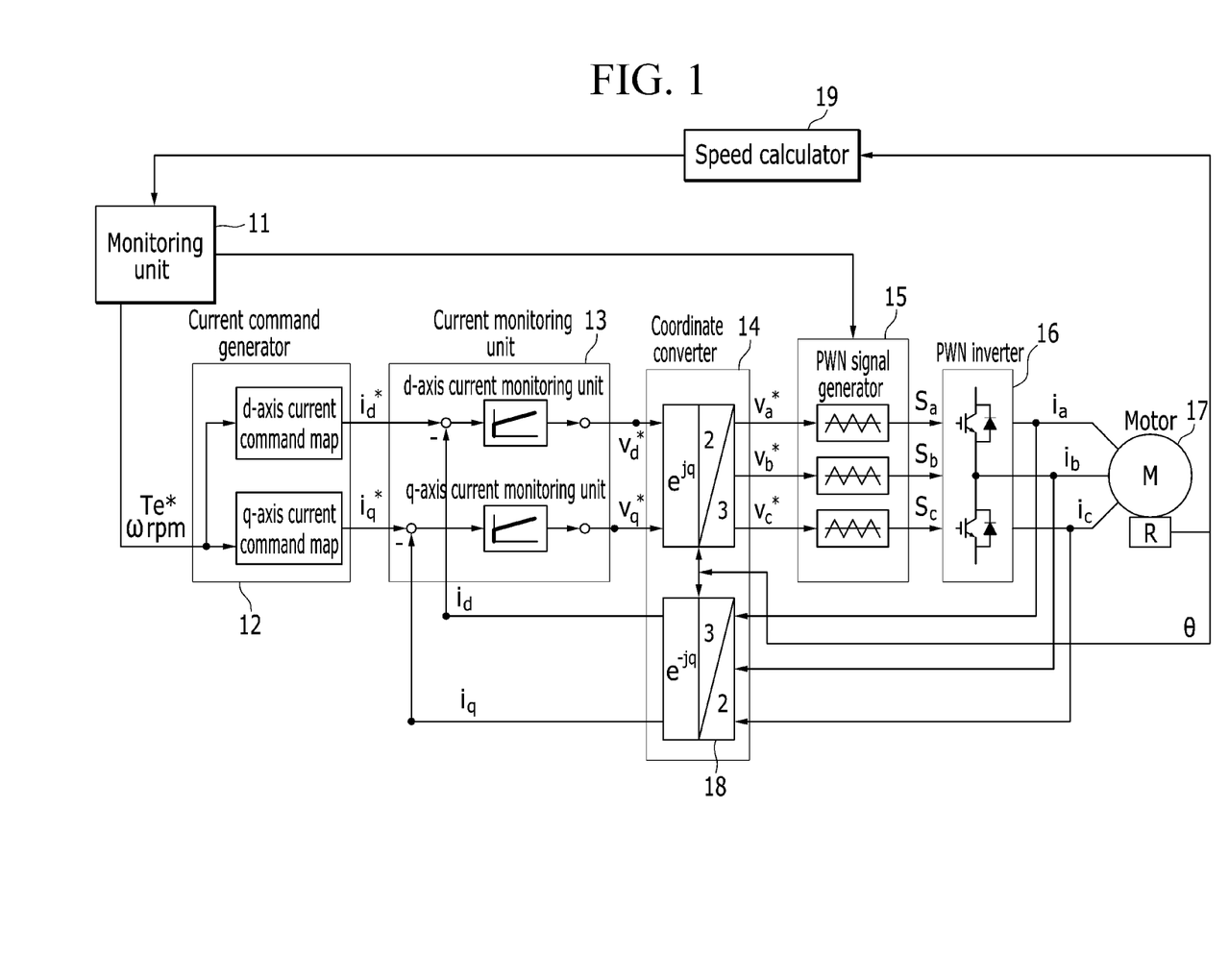
FIG. 1 is a schematic block diagram illustrating a motor system of a hybrid vehicle according to embodiments of the present disclosure.
Figure 2:
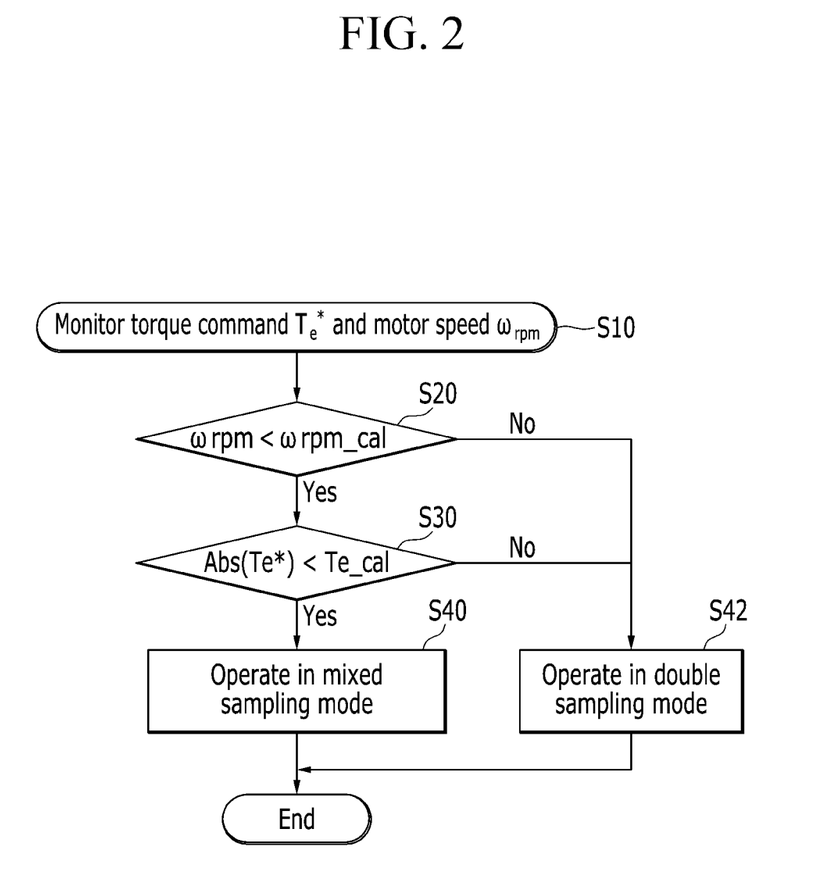
FIG. 2 is a flowchart illustrating an inverter control method for a hybrid vehicle according to embodiments of the present disclosure.

FIG. 1 is a schematic block diagram illustrating the motor system of a hybrid vehicle according to embodiments of the present disclosure and FIG. 2 is a flowchart illustrating an inverter control method for a hybrid vehicle according to embodiments of the present disclosure.

As shown in FIG. 1, the motor system includes a monitoring unit 11, a current command generator 12, a current monitoring unit 13, a d-q/3-phase coordinate converter 14, a PWM signal generator 15, a PWM inverter 16, a motor 17, a resolver R, and a speed calculator 19.

The current command generator 12 supplies a current command $i_d^*$ of d-axis and a current command $i_q^*$ of q-axis depending on an input torque command $T_e^*$ and a motor speed $\omega_{rpm}$ to current monitoring unit 13. Herein, the current command generator 12 includes a current command map per a torque command and a motor speed, and the current command generator 12, may extract current commands $i_d^*$ and $i_q^*$ of d and q axes respectively, corresponding to the torque command $T_e^*$ and the motor speed $\omega_{rpm}$ from the current command map.

Then, the current monitoring unit 13 generates d and q axes voltage commands $V_d^*$ and $V_q^*$ for operating the motor 17, depending on d and q axes current commands $i_d^*$ and $i_q^*$. The current monitoring unit 13 receives a d-axis feedback current $i_d$ applied to d-axis, and a q-axis feedback current $i_q$ applied to q-axis from a 3-phase/d-q coordinate converter 18, and removes a torque error by calibrating d and q axes voltage commands $V_d^*$ and $V_q^*$.

The d-q/3-phase coordinate converter 14 obtains 3-phase voltages $V_a^*$, $V_b^*$, and $V_c^*$ by 3-phase converting d and q axes voltage commands $V_d^*$ and $V_q^*$. The PWM signal generator 15 generates PWM switching signals $S_a$, $S_b$, and $S_c$ by using the switching frequency from the monitoring unit 11 and 3-phase voltage commands $V_a^*$, $V_b^*$, and $V_c^*$, and outputs PWM switching signals $S_a$, $S_b$, and $S_c$ to the PWM inverter 16.

The PWM inverter 16 includes a plurality of switching elements selectively turned on and off by inputted PWM switching signals $S_a$, $S_b$, and $S_c$, and outputs 3-phase currents $I_a$, $I_b$, and $I_c$ for controlling the motor 17.

Further, the 3-phase/d-q coordinate converter 18 outputs the d-axis feedback current $i_d$ and the q-axis feedback current $i_q$, and feedbacks d and q axes feedback currents $i_d$ and $i_q$ to the current monitoring unit 13.

The inverter control method according to embodiments of the present disclosure will be described.

First, in the case of driving using the motor 17, the monitoring unit 11 monitors the driving situation, i.e., the current torque command $T_e^*$ and the motor speed $\omega_{rpm}$ at step S10. Specifically, the monitoring unit 11 may monitor the torque command $T_e^*$ inputted to a current command generator (e.g., generating d and q axes current commands) for a motor controlling. Further, the monitoring unit 11 may monitor the motor speed $\omega_{rpm}$ calculated from the speed calculator 19 based on an absolute angular position θ detected by the resolver R of the motor 17.

Then, the monitoring unit 11 determines whether the current motor speed $\omega_{rpm}$ is less than a first reference speed $\omega_{rpm\_cal}$ at step S20.

In the current switching frequency, in the case that the motor speed $\omega_{rpm}$ is equal to or greater than the first reference speed $\omega_{rpm\_cal}$, the inverter is controlled in a double sampling mode ($F_{samp}=2 \times F_{sw}$) using a frequency that is two times the switching frequency as the sampling frequency at step S42.

Next, in the case that the motor speed $\omega_{rpm}$ is less than the first reference speed $\omega_{rpm\_cal}$, the monitoring unit 11 determines whether a current absolute value of the torque command $|T_e^*|$ is less than a first reference torque $T_{e\_cal}$ at step S30.

In the current switching frequency, the absolute value of the torque command $|T_e^*|$ is equal or greater than the first reference torque $T_{e\_cal}$, the inverter is controlled in the double sampling mode ($F_{samp}=2 \times F_{sw}$) using the frequency that is two times the switching frequency as the sampling frequency at step S42.

In the case that the absolute value of the current torque command $|T_e^*|$ is less than the first reference torque $T_{e\_cal}$, the inverter is controlled in a mixed sampling mode alternately repeating a single sampling mode ($F_{samp}=F_{sw}$) and the double sampling mode ($F_{samp}=2 \times F_{sw}$) for a predetermined period at step S40.

The mixed sampling mode will be described with reference to FIG. 3.

Figure 3:
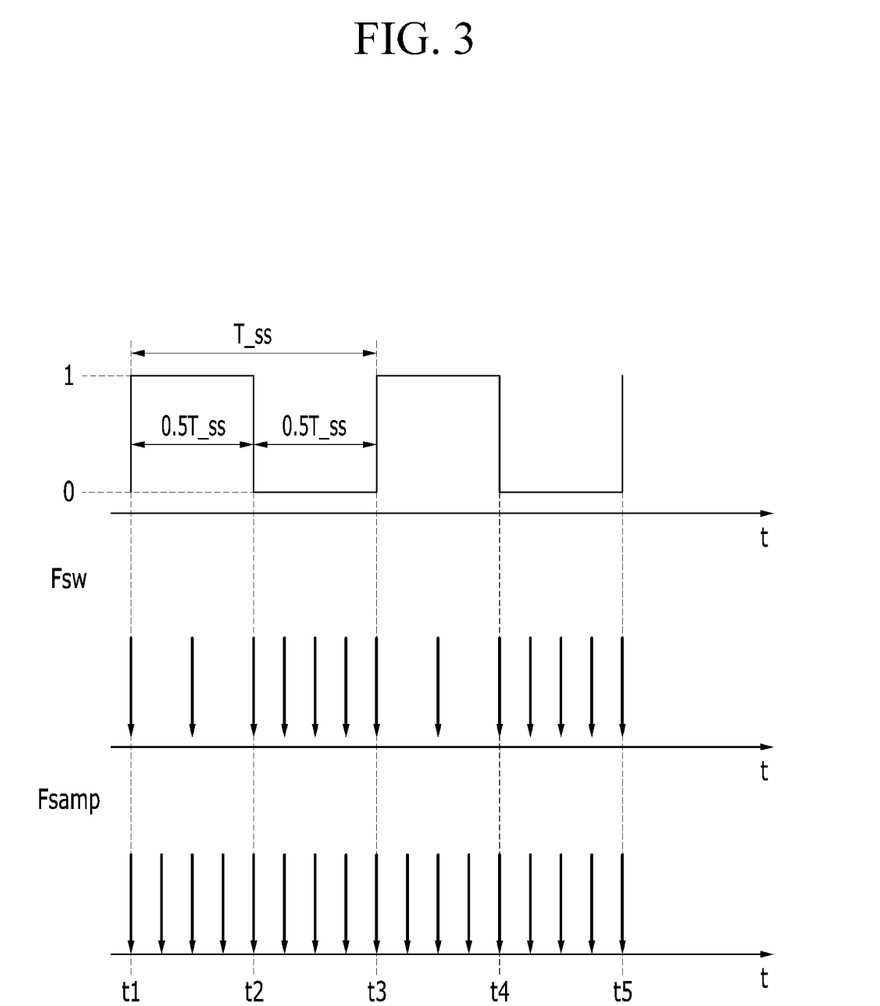
FIG. 3 is a graph illustrating a sampling frequency and a switching frequency according to embodiments of the present disclosure.

FIG. 3 is a graph illustrating the sampling frequency and the switching frequency according to embodiments of the present disclosure. In the case that the motor speed $\omega_{rpm}$ is less than the first reference speed $\omega_{rpm\_cal}$ and the absolute value of the current torque command $|T_e^*|$ is less than the first reference torque $T_{e\_cal}$, the monitoring unit 11 controls the inverter in the mixed sampling mode at step S40.

For example, by a signal repeating 1 or 0 per a half period $0.5T_{\_ss}$ of a predetermined period $T_{\_ss}$, the double sampling mode ($F_{samp}=2 \times F_{sw}$) for setting the switching frequency $F_{sw}$ to the frequency that the sampling frequency $F_{samp}$ is two times the switching frequency $F_{sw}$, and the single sampling mode ($F_{samp}=F_{sw}$) for setting the sampling frequency $F_{samp}$ identical to the switching frequency $F_{sw}$ are repeated.

In time periods of $t_1$ to $t_2$ and $t_3$ to $t_4$, the double sampling mode ($F_{samp}=2 \times F_{sw}$) is selected, and in time periods of $t_2$ to $t_3$ and $t_4$ to $t_5$, the single sampling mode ($F_{samp}=F_{sw}$) is selected. In this case, each time period has an identical period to the half period $0.5T_{\_ss}$.

As such, after the inverter switching frequency $F_{sw}$ is changed into the switching frequency set according to the current torque command $T_e^*$ and the motor speed $\omega_{rpm}$, the changed switching frequency is delivered to the PWM signal generator 15. Accordingly, a triangle-wave oscillator signal is generated by using the changed switching frequency, and a PWM signal is generated.

Herein, a method of generating the triangle-wave oscillator signal and the PWM signal depending on the switching frequency $F_{sw}$ is a conventional art, so detailed descriptions will be omitted.

However, in embodiments of the present disclosure, the switching frequency $F_{sw}$ is varied depending on the current torque command $T_e^*$ and the motor speed $\omega_{rpm}$, and the PWM signal generator 15 generates the PWM signal by using the changed switching frequency. Depending on the PWM signal generated in this process, operating On/OFF of the switching element in the PWM inverter 15 is controlled.

Since a conventional system configuration such as the current command generator 12 for generating d and q axes current commands $i_d^*$ and $i_q^*$, the current monitoring unit 13 for generating d and q axes voltage commands $V_d^*$ and $V_q^*$, the d-q/3-phase coordinate converter 14 for outputting 3-phase voltage commands $V_a^*$, $V_b^*$, and $V_c^*$, the 3-phase/d-q coordinate converter 18 yielding d and q axes feedback currents $i_d$ and $i_q$, and the like. For this, detailed descriptions thereof will be omitted in the present specification, because they are a well-known conventional art.

Figure 4:
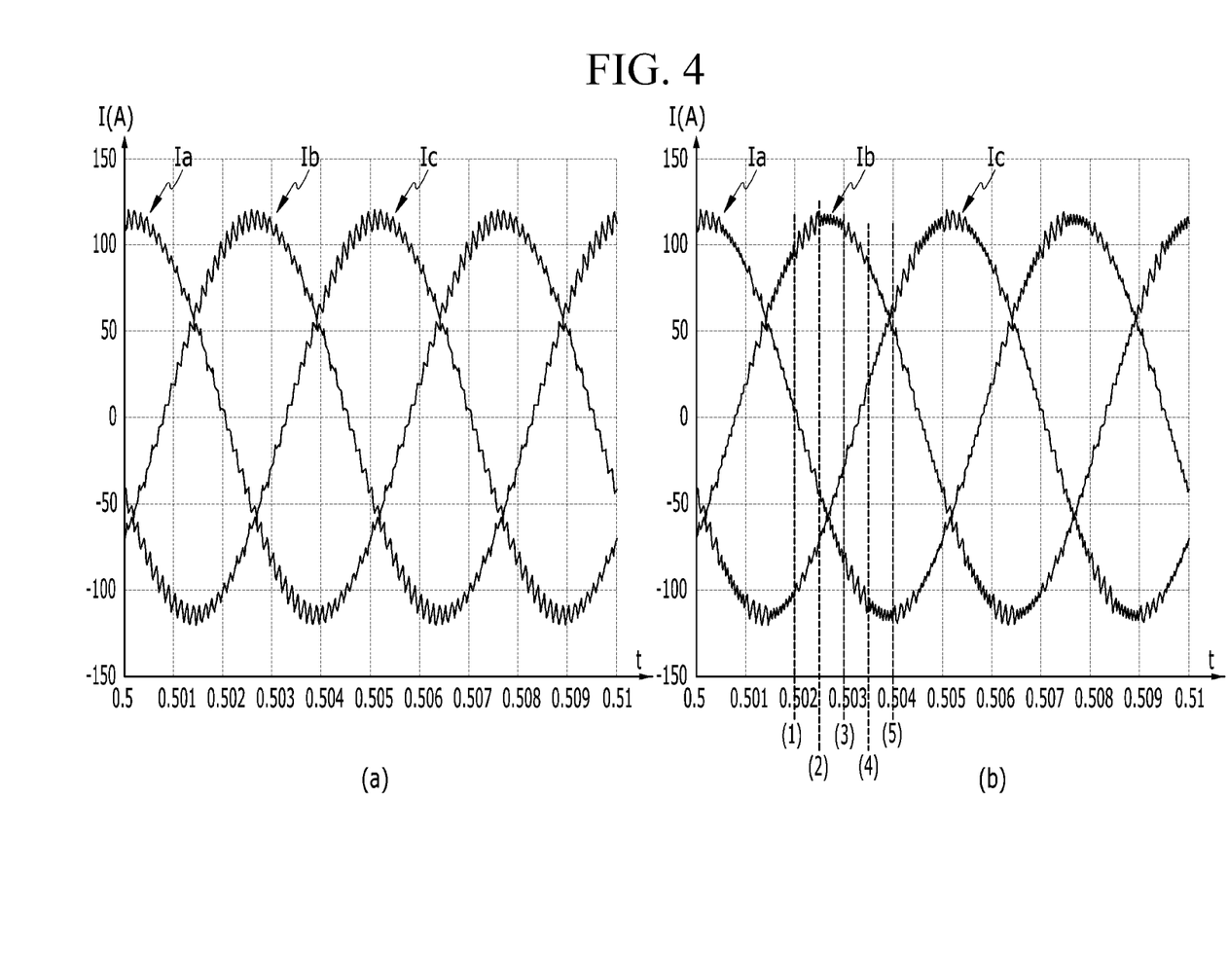
FIG. 4 is a graph illustrating a simulation result of a phase current depending on a switching frequency.
Figure 5:
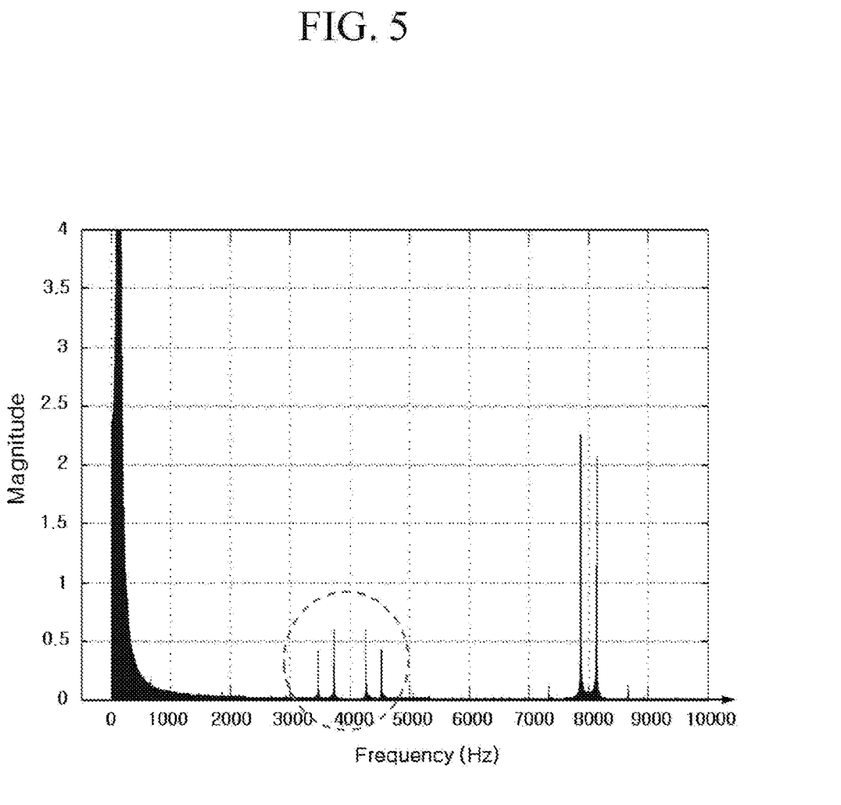
FIG. 5 and FIG. 6 are graphs illustrating a simulation result of a magnitude and a frequency of noise depending on a switching frequency.
Figure 6:
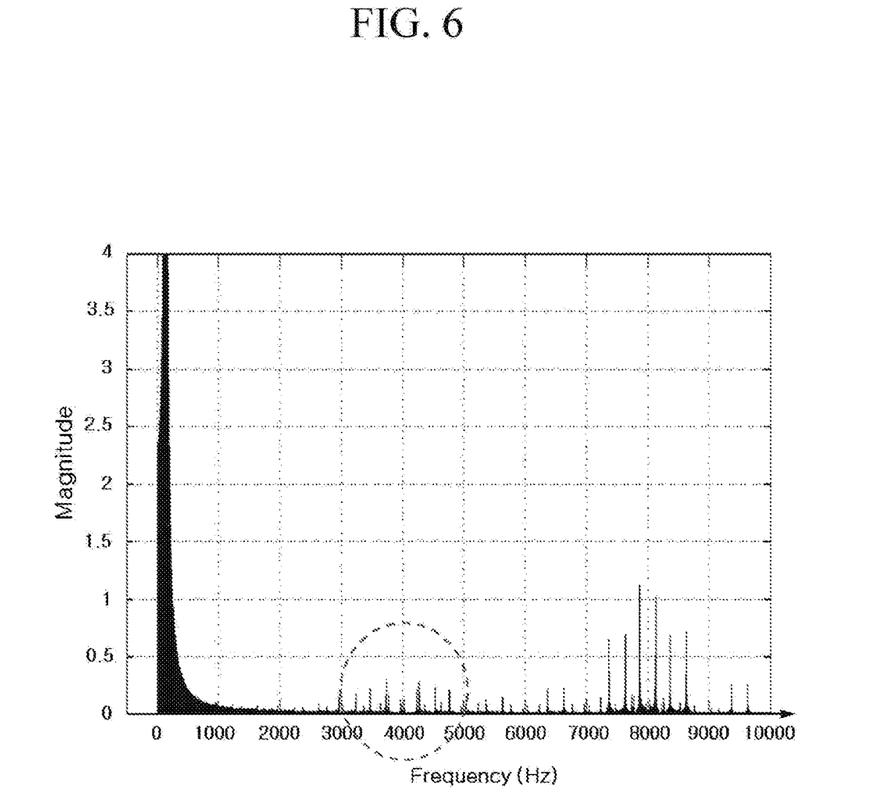

Referring to FIG. 4 to FIG. 6, phase currents and measured noises in the case of using switching and sampling frequencies in the double sampling mode, and in the case of using switching and sampling frequencies in the mixed sampling mode will be described in comparison.

FIG. 4 is a graph illustrating a simulation result of a phase current depending on the switching frequency, and FIG. 5 and FIG. 6 are graphs illustrating a simulation result of an amount and a frequency of noise depending on the switching frequency.

FIG. 4(a) is a graph illustrating a U-phase current $I_a$, a V-phase current $I_b$, and a W-phase current $I_c$ of a measured PWM current, in the case of using switching and sampling frequencies only in the double sampling mode. Further, FIG. 4(b) is a graph illustrating the U-phase current $I_a$, the V-phase current $I_b$, and the W-phase current $I_c$ of the measured PWM current, in the case of using switching and sampling frequencies in the mixed sampling mode.

In time periods of $t_{11}$ to $t_{12}$ and $t_{13}$ to $t_{14}$, the double sampling mode ($F_{samp}=2\times F_{sw}$) is selected, and in time periods of $t_{12}$ to $t_{13}$ and $t_{14}$ to $t_{15}$, the single sampling mode ($F_{samp}=F_{sw}$) is selected. Accordingly, the ripple of the phase current in time periods of $t_{11}$ to $t_{12}$ and $t_{13}$ to $t_{14}$ is smaller than the ripple of the phase current in time periods of $t_{12}$ to $t_{13}$ and $t_{14}$ to $t_{15}$. Hence, NVH performance is improved in a first case of using the mixed sampling mode, in comparison with a second case of using only the double sampling mode ($F_{samp}=2\times F_{sw}$).

FIG. 5 is a graph illustrating a magnitude and a frequency of measured noise in the case of using switching and sampling frequencies only in the double sampling mode. Further, FIG. 6 is a graph illustrating the magnitude and the frequency of measured noise in the case of using switching and sampling frequencies in the mixed sampling mode.

In a 4 KHz region (illustrated by a dotted line) of FIG. 5 and FIG. 6, the magnitude of noise when operating in the mixed sampling mode is smaller than the magnitude of noise when operating in the double sampling mode. Accordingly, the amount of noise is reduced in a first case of using the mixed sampling mode, in comparison with a second case of using only the double sampling mode ($F_{samp}=2\times F_{sw}$).

Since the switching frequency is appropriately varied depending on a motor driving condition, and, for the sampling frequency, an appropriate mode change is executed between the double sampling mode and the single mode, so through the entire operational area, an overall improvement in switching loss, electromagnetic performance, NVH performance, control stability, and the like may be achieved in comparison with using one switching frequency and one sampling frequency.

While this disclosure has been described in connection with what is presently considered to be practical embodiments, it is to be understood that the disclosure is not limited to the disclosed embodiments. Accordingly, those skilled in the art may easy select and substitute therefrom. Further, a person of an ordinary skill in the art may omit a part among aforementioned constituent elements without a degradation of performance, or add an additional constituent element to improve performance thereof. Furthermore, a person of an ordinary skill in the art may alter a sequence of steps described in the present specification depending on a process environment or equipment. Accordingly, the scope of the present disclosure shall not be determined by aforementioned exemplary embodiments, but shall be determined only according to the attached claims.

DESCRIPTION OF SYMBOLS

| | |
|---|---|
| 11: monitoring unit | 12: current command generator |
| 13: current monitoring unit | 14, 18: coordinate converter |
| 15: PWM signal generator | 16: PWM inverter |
| 17: motor | 19: speed calculator |

What is claimed is:

1. An inverter control method for a hybrid vehicle, the method comprising:
   monitoring a torque command and a motor speed of the vehicle in real-time;
   determining whether the motor speed is less than a first speed;
   determining whether an absolute value of the torque command is less than a first torque when the motor speed is less than the first speed;
   changing a switching frequency periodically and alternately between two different frequencies when the absolute value of the torque command is less than the first torque; and
   controlling an inverter operation by generating a pulse-width modulation (PWM) signal with the changed switching frequency;
   wherein the changing of the switching frequency to the predetermined frequency comprises:
   changing a mode between a double sampling mode using a frequency which is twice the switching frequency as a sampling frequency, and a single sampling mode using an identical frequency to the switching frequency as the sampling frequency.

2. The inverter control method of claim 1, further comprising:
   controlling the inverter operation by generating a PWM signal with a fixed switching frequency when the motor speed is greater than or equal to the first speed.

3. The inverter control method of claim 2, further comprising:
   controlling the inverter operation by generating the PWM signal with the fixed switching frequency when the absolute value of the torque command is greater than or equal to the first torque.

* * * * *